United States Patent [19]

Brady et al.

[11] Patent Number: 4,653,043

[45] Date of Patent: Mar. 24, 1987

[54] PRE-CUTOVER VERIFICATION OF SWITCHING SYSTEM SUBSCRIBER LINES SERVED VIA DIGITAL CARRIER FACILITIES

[75] Inventors: Patrick K. Brady, Wheaton; Cecilia S. Chen, Naperville; Barry L. Posterick, Batavia; Gilbert M. Stewart, Bolingbrook, all of Ill.

[73] Assignee: AT&T Bell Laboratories, Murray Hill, N.J.

[21] Appl. No.: 750,147

[22] Filed: Jul. 1, 1985

[51] Int. Cl.[4] .......................... H04J 1/16; H04M 11/00
[52] U.S. Cl. ........................................... 370/13; 379/25
[58] Field of Search ............................. 370/13, 85, 58; 179/2 EB, 175.2 R

[56] References Cited

U.S. PATENT DOCUMENTS

| | | |
|---|---|---|
| 3,752,940 | 8/1973 | Santulli et al. ................ 179/175.2 R |
| 3,892,928 | 7/1975 | Casterline et al. ............ 179/175.2 R |
| 4,046,964 | 9/1977 | Daugherty et al. ............. 179/15 BF |
| 4,147,902 | 4/1979 | Dworak ......................... 179/175.2 R |
| 4,322,843 | 3/1982 | Beuscher et al. ...................... 370/63 |
| 4,403,320 | 9/1983 | Canniff ..................................... 370/56 |
| 4,453,048 | 6/1984 | Daniels et al. ................ 179/175.2 R |
| 4,453,049 | 6/1984 | Daniels et al. ................ 179/175.2 R |
| 4,454,388 | 6/1984 | Daniels ......................... 179/175.2 R |
| 4,493,073 | 1/1985 | Witmore et al. ........................ 370/13 |
| 4,575,839 | 3/1986 | Ogata et al. ............................. 370/13 |
| 4,580,259 | 4/1986 | Harada et al. .......................... 370/58 |

Primary Examiner—Douglas W. Olms
Assistant Examiner—Curtis Kuntz
Attorney, Agent, or Firm—Ross T. Watland

[57] ABSTRACT

A test arrangement and method for use prior to the replacement of a first switching system serving a plurality of subscriber lines via a digital carrier facility and via a remote terminal, by a second switching system, where facility interface equipment of the second system is bridged directly onto the digital facility to allow monitoring of digital signatures transmitted from the remote terminal during the continued, uninterrupted operation of the first system. A pair gain test controller of the first system is advantageously used by the second system to control the generation of such digital signatures to verify the consistency of the translation databases of the two systems in associating directory numbers with subscriber lines.

14 Claims, 13 Drawing Figures

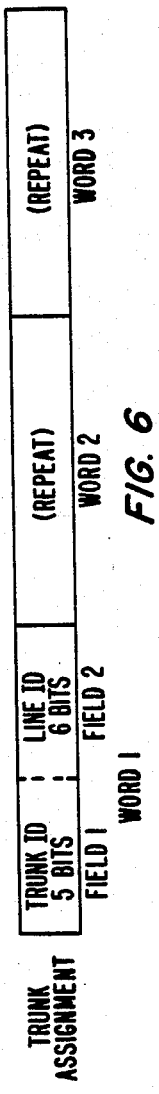
FIG. 6
FIG. 7

AUTOMATIC PRE-CUTOVER TEST PROGRAM IN CENTRAL CONTROL 2030

PRE-CUTOVER VERIFICATION OF SWITCHING SYSTEM SUBSCRIBER LINES SERVED VIA DIGITAL CARRIER FACILITIES

TECHNICAL FIELD

This invention relates to subscriber line testing prior to the cutover of a replacement switching system and, more particularly, to the generation and detection of line-identifying digital signatures representing the activity of subscriber lines served via digital carrier facilities, for verification of the translation database defining such lines in the replacement system.

BACKGROUND OF THE INVENTION

When a new switching system is to replace an existing switching system, the subscriber lines are typically connected in parallel to both switching systems while the old system continues to provide service. The connections between the subscriber lines and the two switching systems are verified to minimize the possibility of service interruption when the new system is cut into service. Such interruptions could occur if, for example, a wiring error is made during the connection of the lines to the new system or an erroneous entry is made in the translation database defining the relationship between directory numbers and equipment numbers in the new system.

In one known test method, the subscriber lines are connected in parallel to both systems at a main distributing frame, and a trunk, referred to herein as an office-to-office trunk, is connected between the two systems. The pre-cutover test of a given subscriber line proceeds as follows. The directory number associated with the given subscriber line in the translation database of the new system, is transmitted over the office-to-office trunk to the old system. The old system responds by establishing a metallic connection between the office-to-office trunk and the main distributing frame terminal defined by the translation database of the old system as being connected to the subscriber line defined by the received directory number. The new system generates a contact closure on the office-to-office trunk. Since a metallic path is present from the office-to-office trunk to the point where the subscriber lines are connected in parallel to the two systems, a successful test is indicated when the contact closure is detected at the main distributing frame terminal defined by the translation database of the new system as being connected to the given subscriber line.

The known test method is, however, not suitable for testing subscriber lines served via digital carrier facilities, such as the AT&T SLC® carrier systems, when such facilities interface directly with digital switching systems. Digital carrier facilities reduce the number of long copper pairs that are extended from a central office by multiplexing the conversations of a number of subscribers on each digital facility. Such use of digital facilities was initially made in conjunction with analog switching systems where the facilities are received in the central office by a central office terminal. The central office terminal is, in turn, connected to the analog system by conventional analog lines. Each of these analog lines corresponds to one of the subscriber lines served via the digital facilities. The digital facilities interface with the subscriber lines at a remote terminal located near the customers' premises. When the analog switching system is replaced by a digital switching system, the central office terminal is, in some cases, removed and the digital facilities are interfaced directly with the replacement digital system. Unlike the existing analog system, the replacement digital system does not have an individual system termination associated with each of the subscriber lines. As a result, a metallic continuity check such as that used in the above-described test method cannot be used as a pre-cutover verification of the subscriber lines.

In view of the foregoing, a recognized problem in the art is the inadequacy of known pre-cutover test methods for verifying switching system subscriber lines served via digital carrier facilities.

SUMMARY OF THE INVENTION

The aforementioned problem is solved and a technical advance is achieved in accordance with the principles of the invention in a pre-cutover test method and apparatus where the replacement digital switching system is bridged directly onto the digital carrier facility to monitor transmissions from the remote terminal during the continued, uninterrupted operation of the existing system, and where subscriber lines are verified by having the existing system control the generation of digital signatures on the facility from the remote terminal, and having the replacement system monitor the facility to detect the correct digital signatures.

In an illustrative test method in accordance with the invention, the replacement system automatically performs a pre-cutover verification of subscriber lines without requiring the completion of a metallic path back to the replacement system. To test a selected line, the replacement system determines the directory number defined by its translation data as being associated with the selected line. The replacement system transmits the directory number to the existing system, which responds by determining the subscriber line defined by its translation data as being associated with the received directory number. The replacement system also transmits a control signal to the existing system to effect a test of the determined line including the generation of a digital signature on an incoming path of the facility from the remote terminal. The digital signature represents activity at the determined line. The replacement system monitors the facility to detect a digital signature representing activity at the selected line.

Such monitoring is advantageously accomplished by bridging onto the digital carrier facility and amplifying digital information received thereon for transmission to the replacement system. The replacement system maintains an activity register including individual bits corresponding to each of the subscriber lines. The replacement system responds to a digital signature representing activity at a particular subscriber line by storing a predetermined logic value in the activity register bit corresponding to that line. To verify a selected line, the replacement system reads the activity register bit corresponding to the selected line to detect the predetermined logic value.

In one exemplary test arrangement, subscriber line verification is performed prior to the replacement of a first switching system which interfaces with a digital carrier facility at a central office terminal, by a second switching system which interfaces with the facility directly. In the first system, the central office terminal is connected to an analog switch by analog lines each corresponding to one of the subscriber lines. The first system includes a test controller which is typically used to effect testing of the subscriber lines served by the digital facility. To perform a pre-cutover test of a selected subscriber line, the second system determines the directory number defined by its translation data as being associated with the selected subscriber line. A trunk unit of the second system transmits the directory number on an office-to-office trunk to the first system. The first system responds by determining the subscriber line defined by the translation data of the first system as being associated with the received directory number. The first system then establishes a metallic path between the office-to-office trunk and the analog line corresponding to the determined subscriber line. The second system connects a DC voltage source to the office-to-office trunk to apply a predetermined DC control voltage via the metallic path and the analog line to the central office terminal. The central office terminal responds to the predetermined control voltage by initiating a handshaking procedure among the central office terminal, the remote terminal and the test controller. The procedure includes the transmission of digital information on the facility to the remote terminal defining a test of the determined subscriber line. The remote terminal responds to the digital information by generating an off-hook condition of the determined subscriber line. The remote terminal then transmits an activity message on the facility defining the off-hook condition. A digital facility interface included in the second system monitors activity messages on the facility and updates an activity register to reflect offhook conditions indicated by such messages. To complete the verification of the selected subscriber line, the second system reads an activity register bit corresponding to the selected line to detect the off-hook condition.

BRIEF DESCRIPTION OF THE DRAWING

A more complete understanding of the invention may be obtained from a consideration of the following description when read in conjunction with the drawing in which:

FIGS. 6 and 7 define the format of two messages used in a digital concentrator system included in the configuration of FIGS. 2 through 5;

FIG. 13 shows the connections between FIGS. 2 through 5.

GENERAL DESCRIPTION

Figure 1:
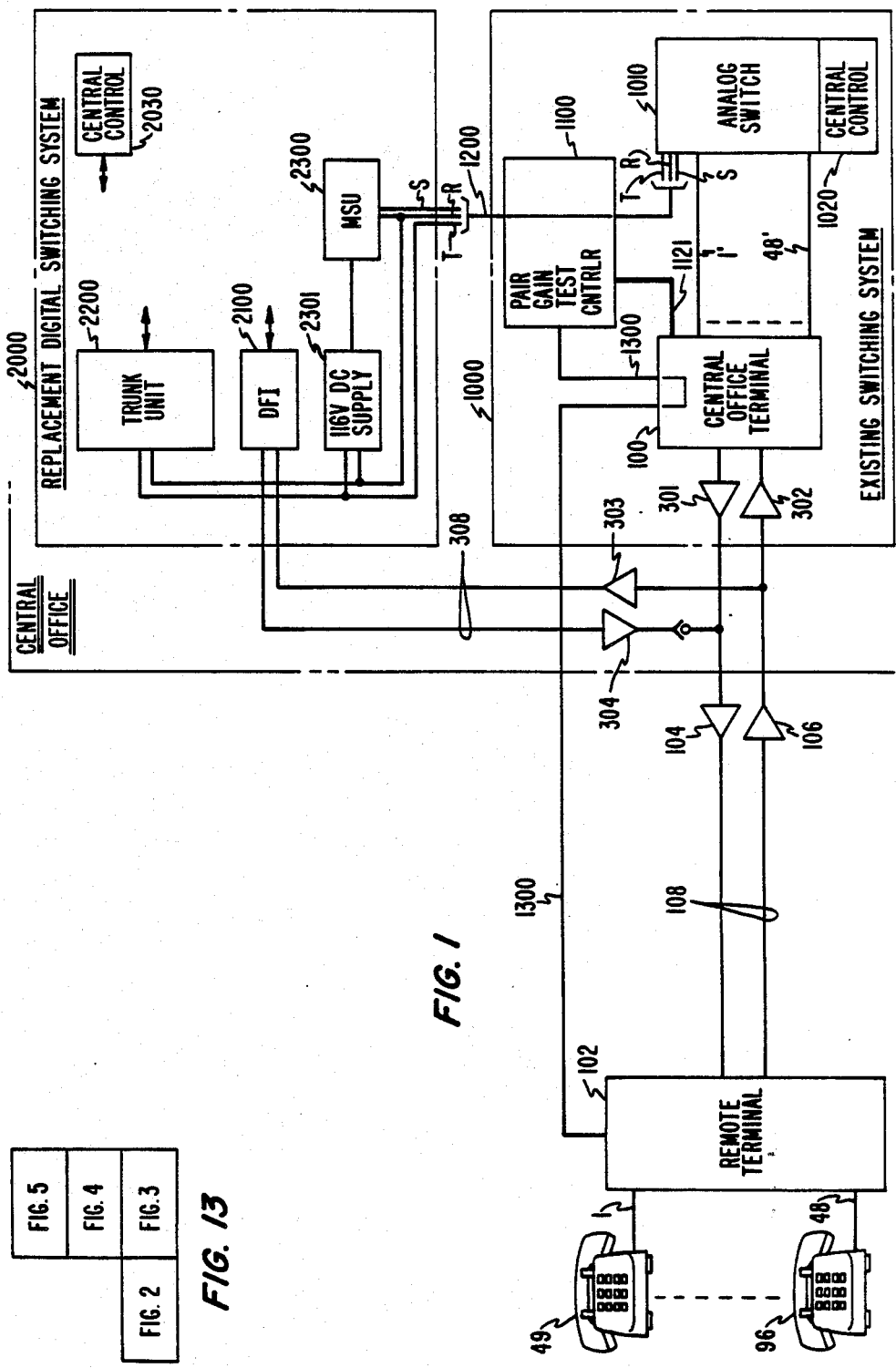
FIG. 1 is a diagram of an exemplary pre-cutover test configuration in accordance with the invention.

FIG. 1 is a diagram of a pre-cutover test configuration used to illustrate the principles of the present invention. In the exemplary configuration, an existing switching system 1000 including an analog switch 1010 such as that described in the *Bell System Technical Journal* of September 1964, is to be replaced by a digital switching system 2000, for example, the system disclosed in U.S. Pat. No. 4,322,843 issued to H. J. Beuscher et al., on Mar. 30, 1982. The existing system 1000 serves a plurality of subscriber lines 1 through 48 via a digital carrier facility 108 and a remote terminal 102. Digital carrier facility 108 comprises what is referred to as the T1 carrier system including 24 channels for conveying calls between 48 subscriber sets 49 through 96 and system 1000 in a concentrated mode of operation, and, in addition, includes a derived data link for message communication. Facility 108, which has repeaters such as repeaters 104 and 106 at spaced intervals along its span from remote terminal 102 to the central office, is interfaced with analog switch 1010 via repeaters 301 and 302, a central office terminal 100 and a plurality of conventional analog lines 1' through 48' each corresponding to one of the subscriber lines 1 through 48.

A pair gain test controller 1100 associated with analog switch 1010 at the central office is used to control the testing of subscriber lines 1 through 48 via a metallic DC bypass path 1300 that is cut through to the subscriber lines 1 through 48. Test controller 1100 also controls the transmission and signaling testing of facility 108. Communications between test controller 1100 and central office terminal 100 are conveyed using a bus 1121.

In accordance with the present invention, an analog trunk 1200 referred to as herein as an office-to-office trunk, is connected from a trunk unit 2200 of the replacement system 2000, through test controller 1100 to analog switch 1010. In addition, the incoming path of digital facility 108 is bridged via a repeater 303 onto the incoming path of a digital facility 308 to allow the transmissions from remote terminal 102 during the continued operation of system 1000, to be monitored by a digital facility interface 2100 included in system 2000. The pre-cutover test of a selected subscriber line, e.g., subscriber line 1, proceeds as follows. A central control 2030 of system 2000 accesses its translation database and determines the directory number defined therein as being associated with subscriber line 1. To seize trunk 1200, a metallic services unit 2300 included in system 2000 applies a negative, high-current condition to the sleeve conductor of trunk 1200 and trunk unit 2200 connects a bridge resistor between the tip and ring conductors of trunk 1200. Trunk unit 2200 then transmits the determined directory number on trunk 1200 to analog switch 1010. Central control 1020 of analog switch 1010 responds to the received directory number by accessing its translation database to determine the subscriber line defined as being associated with the received directory number. An important objective of the pre-cutover test is to verify the consistency of the translation data of the two systems 1000 and 2000. If the translation databases of the two systems 1000 and 2000 are consistent, central control 1020 determines that the received directory number is associated with subscriber line 1. Central control 1020 therefore controls the establishment by analog switch 1010 of a metallic path from trunk 1200 to analog line 1'. Metallic services unit 2300 applies a negative, low-current condition to the sleeve conductor of trunk 1200 as necessary for the proper operation of test controller 1100 and trunk unit 2200 removes the bridge resistor connected between the tip and ring conductors of trunk 1200. Metallic services unit 2300 also energizes a supply 2301 to apply a 116-volt DC voltage, referred to herein as a control signal, between the tip and ring conductors of trunk 1200. The DC voltage is transmitted via the established metallic path of switch 1010 and analog line 1' to central office terminal 100 which responds by initiating a handshaking procedure among central office terminal 100, remote terminal 102 and test controller 1100. Central office terminal 100 selects one of the channels of facility 108 and transmits a definition of the selected channel to remote terminal 102 using the facility 108 derived data link. Central office terminal 100 also transmits a test code or test signal in the selected channel to inform remote terminal 102 that a test of subscriber line 1 is to be conducted using the selected channel. Remote terminal 102 subsequently generates an off-hook condition of subscriber line 1 and, in response to such off-hook condition, transmits an activity message on the facility 108 derived data link defining the off-hook condition of subscriber line 1. The activity message is a digital signature since it defines subscriber line 1 as the source of off-hook activity. Digital facility interface 2100 maintains an activity register comprising 48 bits defining the on-hook/off-hook status of subscriber lines 1 through 48. Digital facility interface 2100 monitors via facility 308 activity messages on facility 108 and updates its activity register accordingly. Digital facility interface 2100 responds to the activity message defining the off-hook condition of subscriber line 1, by writing a logic one into the bit position of its activity register corresponding to subscriber line 1.

After the 116-volt DC control voltage is applied to trunk 1200 when metallic services unit 2300 energizes supply 2301, system 2000 begins reading the bit position corresponding to subscriber line 1 in the activity register of digital facility interface 2100, at 100-millisecond intervals to detect a logic one bit indicating that the off-hook condition of subscriber line 1 has been stored therein. A detection of such logic one bit indicates that the pre-cutover test of subscriber line 1 has been successfully completed. If a logic one bit is not detected within five seconds, the test of subscriber line 1 is not successful which typically indicates that the translation databases of the two systems 1000 and 2000 are inconsistent.

Metallic services unit 2300 deenergizes supply 2301 and again applies the negative, high-current condition to the sleeve conductor of trunk 1200. Metallic services unit 2300 subsequently opens the sleeve conductor of trunk 1200. Such opening of the sleeve conductor, which is referred to herein as the other control signal, interrupts the test sequence being performed by test controller 1100 and the various test connections that had been completed are dropped. The above-described test procedure can then be repeated for subscriber lines 2 through 48.

DETAILED DESCRIPTION

FIGS. 2 through 5, when arranged in accordance with FIG. 13, present the test configuration of FIG. 1 in greater detail. The description which follows is arranged in four parts. First the digital concentrator system 99 used by the existing system 1000 to serve subscriber lines 1 through 48 is described. The normal method of testing lines 1 through 48 from a repair service bureau 1400 is then described, followed by a description of the replacement digital system 2000. With this information as background, the pre-cutover test method and apparatus illustrating the present invention is then described in detail.

Digital Concentrator System 99

Figure 2:
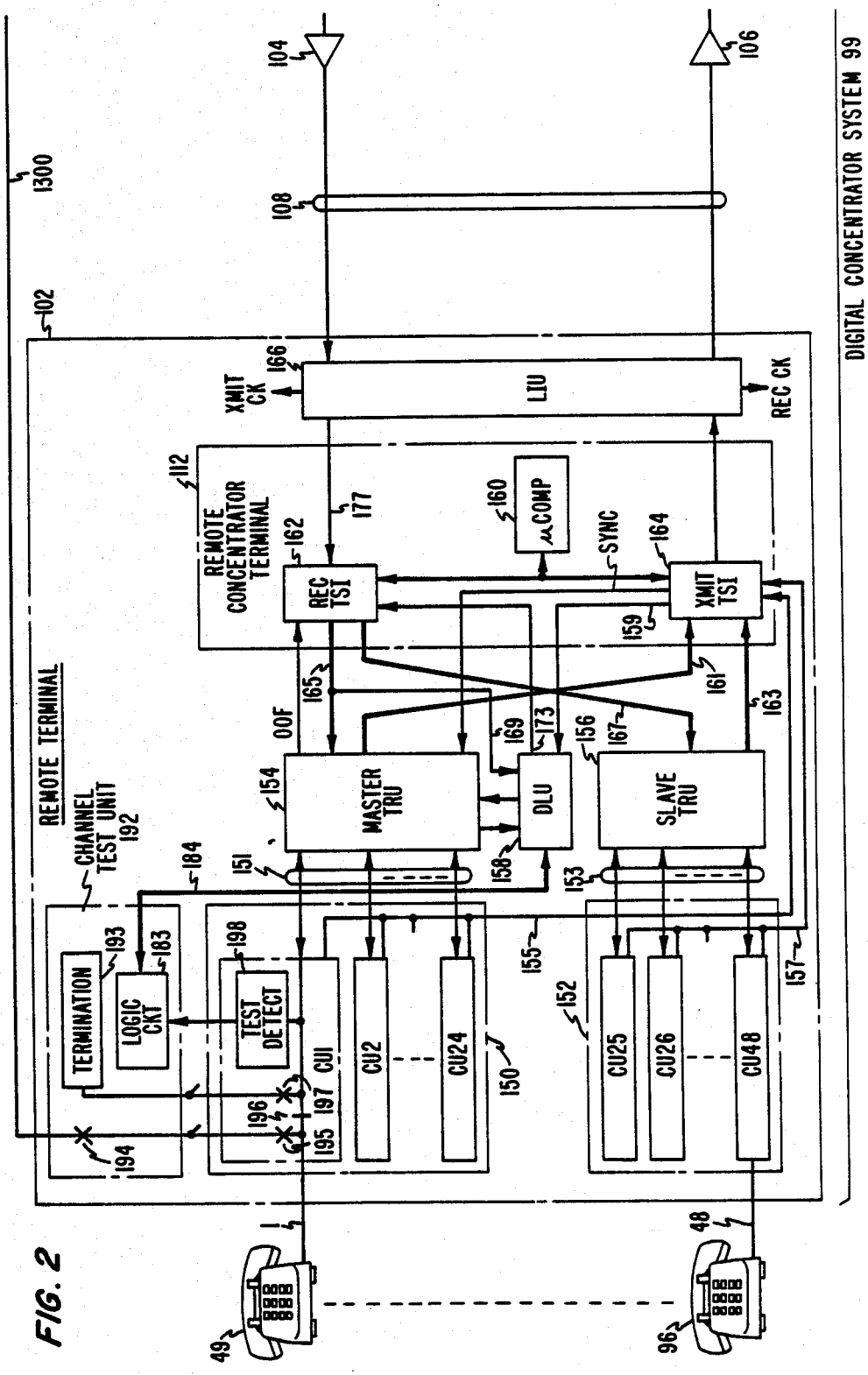
FIGS. 2 through 5, when arranged in accordance with FIG. 13, present a more detailed diagram of the test configuration of FIG. 1.
Figure 3:
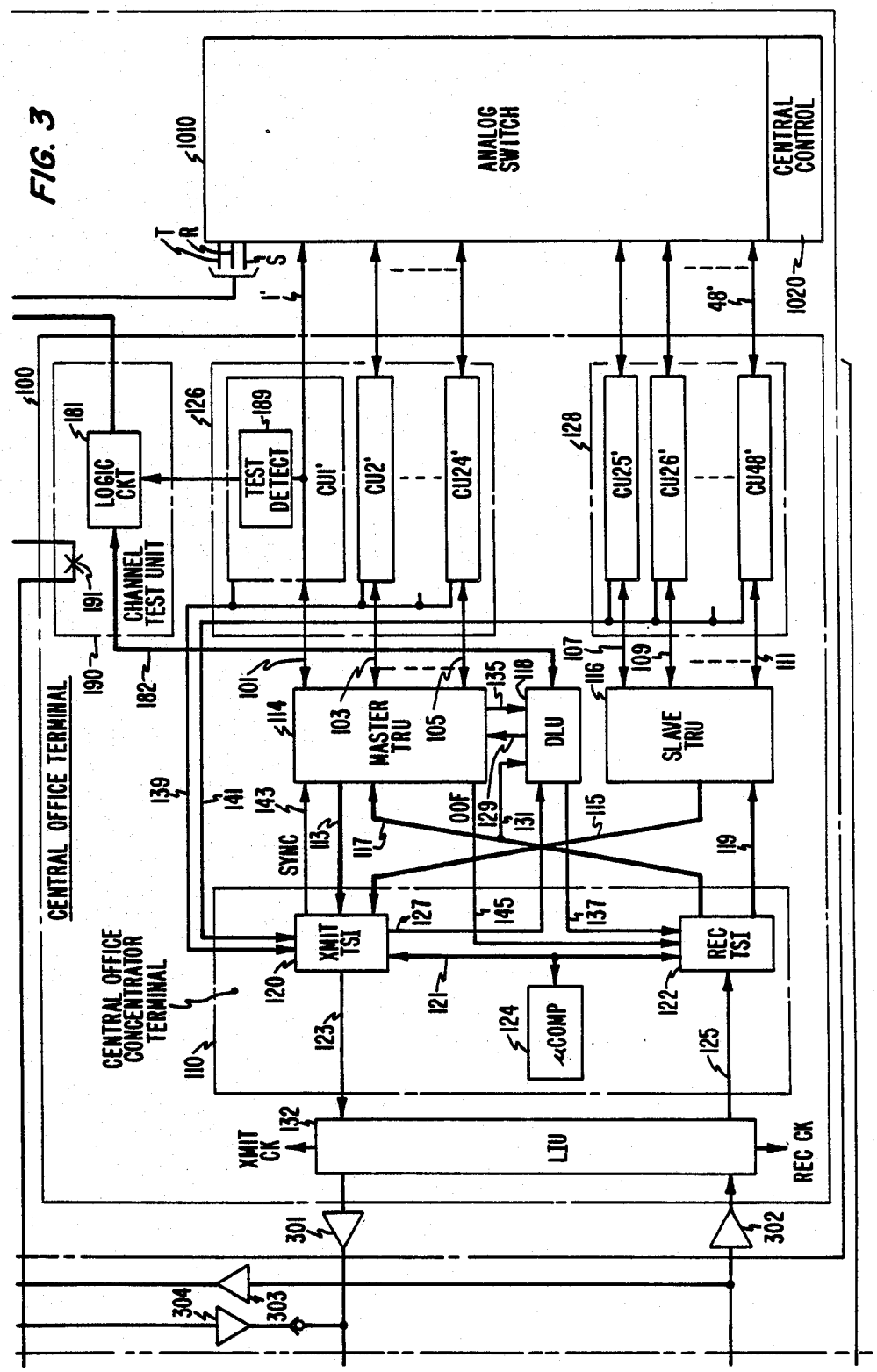

FIGS. 2 and 3 include a diagram of digital concentrator system 99 comprising a central office terminal (COT) 100, a PCM digital transmission facility 108, and a remote terminal (RT) 102. Referring more particularly to COT 100 (FIG. 3), there is shown a first group 126 of twenty-four so-called "D-type" channel units CU1', CU2', . . . CU24' for periodically producing and receiving pulse amplitude modulation (PAM) samples from voice messages on lines 1', 2', . . . 24', respectively, for producing per line signaling information, and for producing per line class of service information. A second group 128 of twenty-four D-type channel units CU25', CU26', . . . CU48' performs a similar function for lines 25', 26', . . . 48'. A more detailed description of the D-type channel units can be found in U.S. Pat. No. 4,059,731 granted to J. H. Green and J. E. Landry on Nov. 22, 1977.

The first group 126 of channel units is connected with a master transmit-receive unit (master TRU) 114 through conductors 101, 103, . . . 105 for bidirectional PAM transmission. Similarly, the second group 128 of channel units is connected with a slave transmit-receive unit (slave TRU) 116 through conductors 107, 109, . . . 111 for bidirectional PAM transmission.

In the transmit direction, the master TRU 114 performs the functions of generating timing pulses to direct sampling and supervision by the first group of channel units 126, encoding the PAM samples from the first group of channel units 126 into PCM code groups, multiplexing the PCM code groups to form a PCM bit stream, and inserting framing bits into the PCM bit stream to derive a multiplexed digital pulse stream, sometimes referred to as a DS1 signal. In the receive direction, the master TRU 114 performs the functions of demultiplexing the received DS1 PCM bit stream to derive the separate PCM code groups, decoding the PCM code groups into PAM samples, and extracting the timing, framing, and signaling information. The slave TRU 116 performs similar functions for the second group of channel units 128. A more detailed description of the transmit-receive units 114 and 116 can be found in the above-mentioned Green et al. patent.

Both TRU 114 and TRU 116 are connected to a transmit time slot interchanger (transmit TSI) 120 by conductors 113 and 115, respectively, for transmission of the outgoing multiplexed PCM streams. A central office terminal concentrator (COT concentrator) 110 comprises the transmit TSI 120, a receive time slot interchanger (receive TSI) 122 and a microcomputer 124, interconnected by a bus 121 for address and data communication. The receive TSI 122 and the TRU's 114 and 116 are connected by conductors 117 and 119, respectively, for transmission of incoming multiplexed PCM bit streams.

The multiplexed outgoing PCM bit streams on conductors 113 and 115 are demultiplexed at the transmit TSI 120 and the PCM code groups are individually stored. Up to twenty-four of the stored PCM samples are selectively retrieved from the transmit TSI 120, multiplexed, and the framing bit from the PCM bit stream on conductor 113 inserted to derive a concentrated PCM bit stream for transmission on conductor 123 to the remote terminal concentrator (RT concentrator) 112. Each of the twenty-four PCM samples selectively retrieved from the transmit TSI 120 is assigned to a unique one of the twenty-four time slots available in each frame on transmission facility 108. Each time slot in facility 108 is referred to as a concentrator trunk.

The assignment of a subscriber line to a concentrator trunk is controlled by the microcomputer 124 at the COT concentrator 110. The assignment information is transmitted to the RT concentrator 112 for duplicating the same assignments at the remote terminal. This assignment information is transmitted from the COT concentrator 110 to the RT concentrator 112 via data messages. These data messages are assembled at the microcomputer 124 and transmitted through the transmit TSI 120 embedded, as will be described, in the concentrated PCM bit stream. Similarly, other information is transmitted between the concentrator terminals 110 and 112 via data messages.

The trunk assignment data message (FIG. 6) comprises three words. Each word comprises 11 bits divided into two fields. The first field comprises five bits for a trunk identification number ($2^5=32$). The second field comprises six bits for the line identification number that is assigned to the trunk identified in the first field ($2^6=64$). The second and third words repeat the same information contained in the first word, protecting against errors in transmission by triple redundancy. If the RT concentrator 112 receives two out of the three words which match, it assumes the message has been correctly received.

An example of a message that is transmitted from the RT concentrator 112 to COT concentrator 110 is the activity message (FIG. 7) for activity information. Activity represents the on-/off hook status of the subscriber stations. Activity information is transmitted from the RT concentrator 112 in response to a change in status of a subscriber line.

The activity message of FIG. 7 comprises three words. The first word comprises two fields. The first field identifies a line group and comprises three bits. Lines 1, 2 . . . 48 are divided, for convenience, into six groups of eight lines each. Hence, three bits are required to identify any of the six line groups ($2^3=8$). The second field comprises eight bits to convey activity information (1 or 0) for all eight lines in the identified line group. Each bit represents the on-/off-hook status for one line in the identified line group. A "1" indicates off-hook and a "0" indicates on-hook. Words two and three are repeats of word one to guard against errors in transmission. If the COT concentrator 110 receives two out of the three words which match, it assumes that the message has been correctly received.

Figure 8:
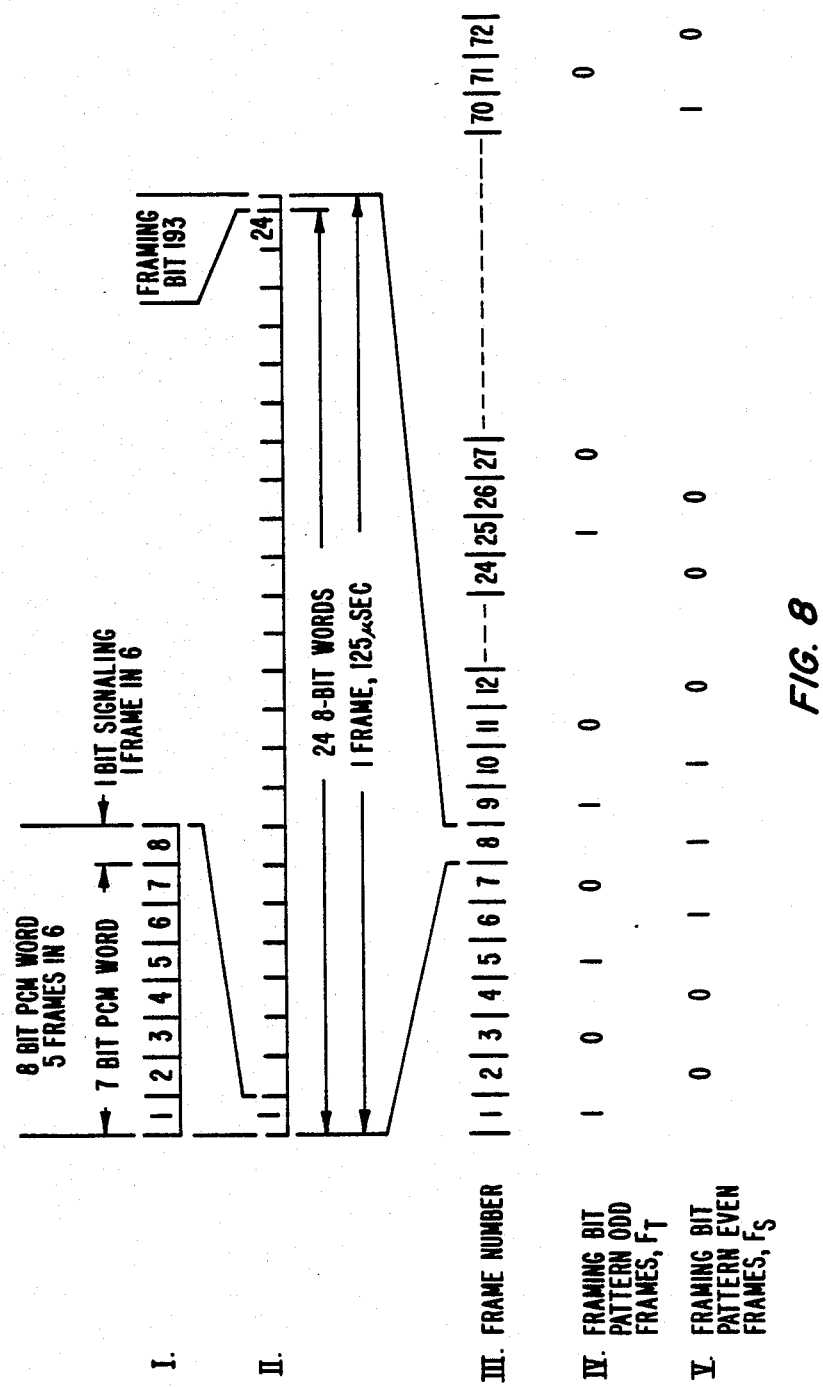
FIG. 8 defines the frame format used in the digital concentrator system included in the configuration of FIGS. 2 through 5.

Referring temporarily to FIG. 8 there are shown timing diagrams that illustrate how the data link message channel is derived. Timing diagram I shows a PCM word comprising eight bits. As mentioned earlier in connection with FIG. 3, information signals on lines 1' 2' . . . 48' are sampled by the first group 126 of channel units and the second group 128 of channel units to produce PAM samples. These PAM samples are then encoded by the TRU's 114 and 116 to produce eight-bit PCM words. In every sixth frame, the eighth bit is used for transmitting per line signaling information. The signaling information transmitted relates, for example, to ringing signals to be applied to subscriber lines.

Timing diagram II represents one frame of information transmitted in 125 microseconds. One frame comprises twenty-four eight-bit PCM words ($24 \times 8 = 192$ bits) and one framing bit in the 193rd bit position. Each PCM word has a format shown in diagram I. Every sixth frame, the eighth bit in all twenty-four PCM words is used for transmitting per channel signaling information, one bit for each of the twenty-four channels.

Diagram III shows seventy-two consecutively numbered frames ($72 \times \frac{1}{8} = 9$ ms) each frame having a format as shown in diagram II. In diagram IV there is shown the terminal framing bit pattern $F_T$ appearing in the 193rd bit positions in odd numbered frames. The terminal framing bit pattern comprises an alternating sequence of "1's" and "0's" and permits overall framing at the receiving terminal.

Diagram V represents the supervisory framing bit pattern $F_S$ appearing in the 193rd bit positions of even numbered frames. The pattern comprises three consecutive zeros followed by three consecutive ones. The change from zeros to ones and the change from ones to zeros in the supervisory framing bit pattern mark every sixth frame for recovering the per line signaling information contained in the eighth bit position of the PCM words therein. Out of seventy-two consecutive frames, only twelve of the thirty-six supervisory framing bit positions are needed for framing. The remaining twenty-four bit positions may therefore be used for other than framing information. Use is made of some of these bit positions to derive a data link for transmission of the data messages of FIGS. 6 and 7 between COT 100 and RT 102. Eleven of the twenty-four unused supervisory framing bit positions constitute a 1,222 bps data link ((11 bits/9 ms) $\times$ 1000 ms/sec = 1,222 bits/sec) for transmitting data messages relating to the concentrator functions. In U.S. Pat. No. 4,245,340 of J. E. Landry, the derived data link is described in more detail.

Referring back to FIG. 3, there is shown a conductor 127 for transmitting data messages originating at microcomputer 124, passed via bus 121 to TSI 120 and, one eleven bit data word at a time, from transmit TSI 120 to data link unit (DLU) 118. The eleven bits in DLU 118, are transmitted, one bit at a time, over conductor 129 to the master TRU 114 for insertion in the appropriate 193rd bit positions constituting the data link on the pulse stream on conductor 113. The slave TRU 116 inserts normal framing bit patterns in the 193rd bit positions of the pulse stream on conductor 115.

The PCM streams for TRU's 114 and 116 are transmitted over conductors 113 and 115, respectively, to transmit TSI 120 where up to twenty-four PCM samples may be selectively multiplexed for transmission over conductor 123, thereby achieving the conductor function at the COT concentrator 110. At transmit TSI 120, the framing bits from the master PCM stream from master TRU 114 are inserted in the 193rd bit positions of the concentrated PCM bit stream, while the framing bits from the slave TRU 116 are discarded.

To minimize errors in transmission, the outgoing unipolar PCM bit stream on conductor 123 is converted to a bipolar pulse stream by the line interface unit (LIU) 132. The outgoing bipolar concentrated PCM pulse stream transmitted to RT 102 from LIU 132 is passed through pulse repeaters 301 and 104 which are two of a plurality of such repeaters. The incoming bipolar concentrated PCM stream, received from the RT 102 is similarly passed through pulse repeaters 106 and 302 which are two of a plurality of such repeaters. The received concentrated bipolar bit stream is then converted from bipolar to unipolar signals at LIU 132. The received concentrated PCM stream is transmitted from LIU 132 to the receive TSI 122 over conductor 125. The LIU 132 also generates a 6.176 MHz transmit clock signal for the transmit TSI 120, and the transmit portion of master TRU 114, and the transmit portion of the slave TRU 116. From the concentrated PCM stream received from the remote terminal 102, a receive clock signal is extracted at LIU 132 for the receive TSI 122 and the receive portions of the master TRU 114 and slave TRU 116.

The concentrated PCM stream received on conductor 125 is selectively stored in the receive TSI 122 and sequentially retrieved to derive two separate multiplexed PCM pulse streams of twenty-four words per frame each, thereby performing the expansion function. The expansion function performed at the receive TSI 122 is the exact opposite of the function performed during the concentration stage at transmit TSI 120. Receive TSI 122 and transmit TSI 120, however, operate independently and asynchronously of each other. The expanded PCM streams are transmitted over conductors 117 and 119 to master TRU 114 and 116, respectively.

Conductor 131, bridged to conductor 117, is connected to DLU 118. In order to extract the data link messages from the received PCM stream, timing pulses occurring in the 193rd bit position of the received pulse train from master TRU 114 are transmitted over conductor 135 to DLU 118. Data link messages, extracted by using these timing pulses, are transmitted back from DLU 118 to receive TSI 122 over conductor 137 in order to take advantage of the interface with microcomputer 124 in receive TSI 122. At the receive TSI 122, the data messages are read by microcomputer 124, decoded and appropriate action taken. A similar function is performed at the RT concentrator 112.

Signaling information, e.g., ringing signals, from the first group 126 of channel units is detected and sequentially and periodically transmitted from each channel unit over a common bus 139 to transmit TSI 120. Similarly, signaling information from each channel unit in the second group 128 is detected and sequentially and periodically transmitted over a common bus 141 to transmit TSI 120. Signaling information thus collected from all forty-eight lines is stored in six activity words of eight bits each in TSI 120. In a signaling activity word, each bit represents the activity of one line. Off-hook information, collected in TSI 164 at RT 102, is also transmitted to COT 100 via the data link and stored as activity words in microcomputer 124.

On command, an activity word is transmitted from the transmit TSI 120 to microcomputer 124 in order to determine if a change in status of the activity for a line has occurred since the last time the activity word has been examined. Similarly, activity words from RT 102 stored in the microcomputer 124 memory is examined. If the status of a line has changed, i.e., if a line is determined to have received a ringing signal or has gone off-hook, thereby requesting service, an idle trunk must be assigned to that line. If a line has gone on-hook, the trunk assigned to that line must be deassigned. Consequently, trunk assignment and deassignment data words are assembled in microcomputer 124 for transmission through transmit TSI 120 and the data link to the RT concentrator 112. Activity status for all forty-eight lines are thus maintained at the COT concentrator 110 for both originations at the COT 100 and originations at the RT 102.

In the transmit direction, synchronization is obtained by pulses transmitted from transmit TSI 120 over conductor 143 to master TRU 114 and to slave TRU 116 (conductor not shown). In the receive direction, TRU's 114 and 116 and receive TSI 122 are synchronized to the concentrated PCM stream received from the RT 102. If framing is lost at the master TRU 114, an out-of-frame (OOF) signal is transmitted over conductor 145 to the receive TSI 122; normal processing is inhibited and a special out-of-frame mode of operation is entered until framing is recovered at the master TRU 114. When framing is recovered at the master TRU 114, the out-of-frame signal is removed from conductor 145. On recognition of this state at the receive TSI 122, the out-of-frame mode of operation is discontinued and the normal mode of operation is resumed.

Referring to the RT 102 in FIG. 2, 24 subscriber stations are connected to a third group 150 of channel units CU1, CU2, . . . CU24, respectively. Similarly, 24 subscriber stations are connected to a fourth group 152 of channel units CU25, CU26 . . . CU48. The third group 150 of channel units is connected to a master TRU 154 through conductors 151 for bidirectional PAM transmission. Similarly, the fourth group 152 of channel units is connected to a slave TRU 156 through conductors 153 for bidirectional PAM transmission.

RT 102 is identical in most respects to the COT 100 and performs the same functions as described earlier in connection with COT 100. However, RT 102 may be distinguished from the COT 100 in that all information necessary for the assignment of idle trunks to busy lines is stored only at COT concentrator 110. Necessarily then, all assignments are also performed only at COT concentrator 110. Digital concentrator system 99 is described in further detail in U.S. Pat. No. 4,403,320, of R. J. Canniff, issued Sept. 6, 1983.

Line Testing from Repair Service Bureau 1400

A pair gain test controller 1100 (FIG. 4) associated with analog switch 1010 at the central office, is used to control the testing of the subscriber lines 1 through 48 and the digital facility 108. Test controller 1100 cooperates with a channel test unit 190 in central office terminal 100, and with a channel test unit 192 in remote terminal 102, to establish a DC bypass path 1300 around digital facility 108 to the subscriber lines 1 through 48. This allows a repair service bureau 1400 to perform standard DC tests on each subscriber line. While this is going on, test controller 1100 is automatically performing a series of transmission and signaling tests on the associated channel of digital facility 108.

Figure 9:
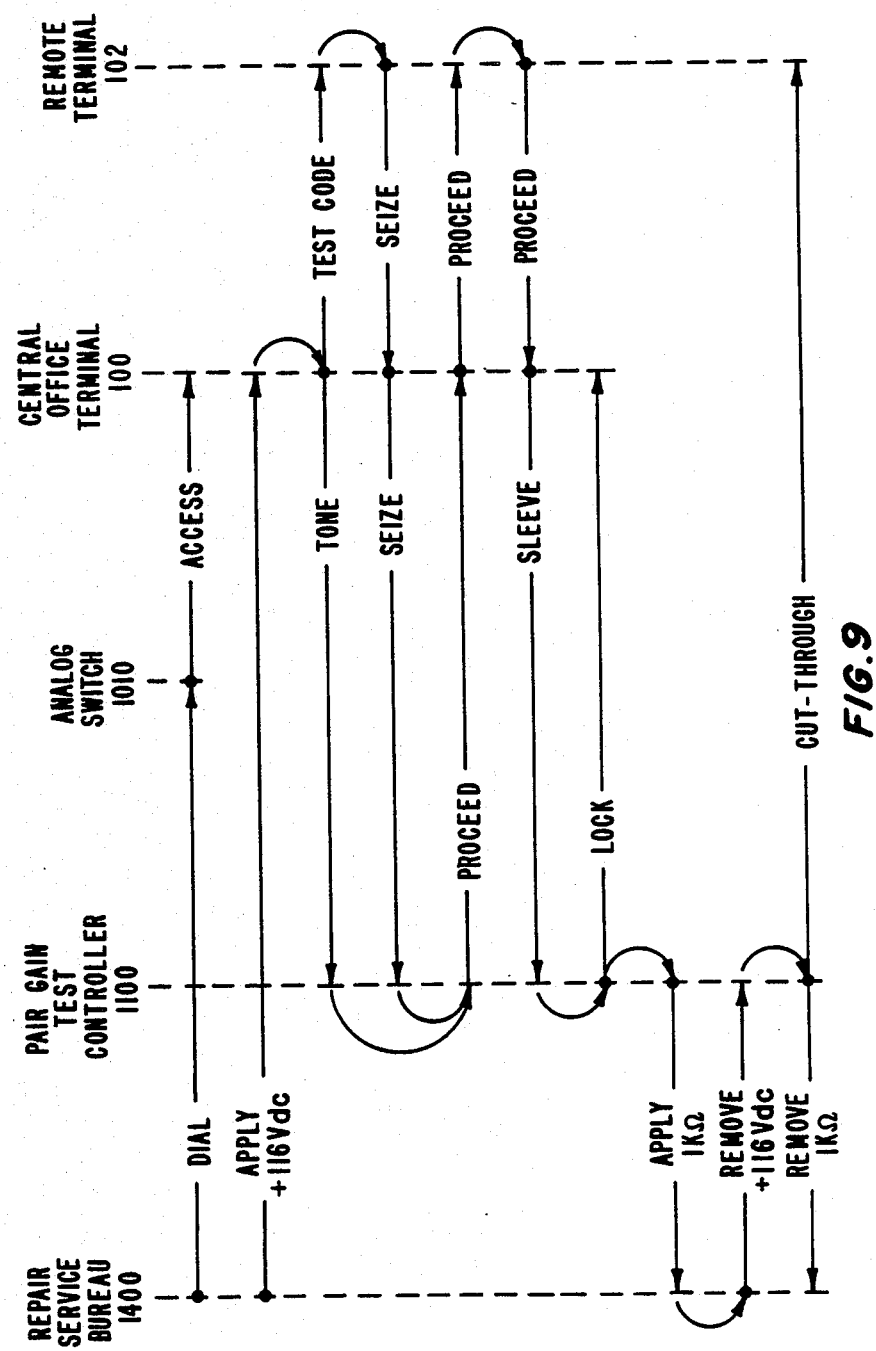
FIG. 9 defines the sequence of steps involved in testing lines served via a digital carrier facility from a repair service bureau.

To test a selected subscriber line, e.g., subscriber line 1, repair service bureau 1400 transmits the directory number associated with line 1, on a trunk 1200 through test controller 1100 to switching system 1000. (A diagram detailing the sequence of events associated with a line test is given in FIG. 9.) Central control 1020 responds by accessing its translation database to determine which of the subscriber lines 1 through 48 is associated with the received directory number. In accordance with the present example, central control 1020 determines that the received directory number is associated with subscriber line 1, and then controls the establishment by analog switch 1010 of a metallic path from trunk 1200 to analog line 1' which corresponds to subscriber line 1.

To initiate the cut-through of bypass path 1300, repair service bureau 1400 applies a DC voltage of 116 volts to trunk 1200. A test detector 189 included in channel unit CU1', receives the DC voltage via the metallic connection that has been established by analog switch 1010 from trunk 1200 to line 1'. Test detector 189 responds to the DC voltage by transmitting a signal to a logic circuit 181 of channel test unit 190. As has been described, central office terminal 100 communicates with remote terminal 102 via messages on the derived data link of digital facility 108. In central office terminal 100, derived data link messages are conveyed between a logic circuit 181 in channel test unit 190 and data link unit 118 via a path 182. In remote terminal 102, derived data link messages are conveyed between a logic circuit 183 included in channel test unit 192 and data link unit 158 via a path 184. Central office terminal 100 assigns an available trunk or channel of digital facility 108, e.g., channel 13, and the appropriate assignments are written into transmit TSI 120 and receive TSI 122 such that information received on line 1' is transmitted on channel 13 of digital facility 108, and information received on channel 13 is transmitted on line 1'. Central office terminal 100 then transmits a trunk assignment message (FIG. 6) defining the assigned channel 13 to remote terminal 102. In response to the trunk assignment message, assignments are written into transmit TSI 164 and receive TSI 162 such that information received on line 1 is transmitted on channel 13 of digital facility 108, and information received on channel 13 is transmitted on line 1.

Also in response to the receipt of the DC voltage by test detector 189, channel unit CU1' returns a 333-Hz test tone on line 1' and transmits a predetermined test code via channel 13 of digital facility 108 to channel CU1 in remote terminal 102. The test code is transmitted using the signaling bits that are available during every sixth frame (see FIG. 8). The test code is received by a test detector 198 included in channel unit CU1. Test detector 198 transmits a signal to logic circuit 183 of channel test unit 192 indicating that the test code has been detected, and, in response, channel test unit 192 effects the transmission of a SEIZE signal via the digital facility 108 derived data link to channel test unit 190. Channel test unit 190 responds to the SEIZE signal, and to the signal from test detector 189 indicating that the DC voltage is being received, by transmitting a SEIZE signal via bus 1121 to a microcomputer 1120 included in test controller 1100.

Figure 4:
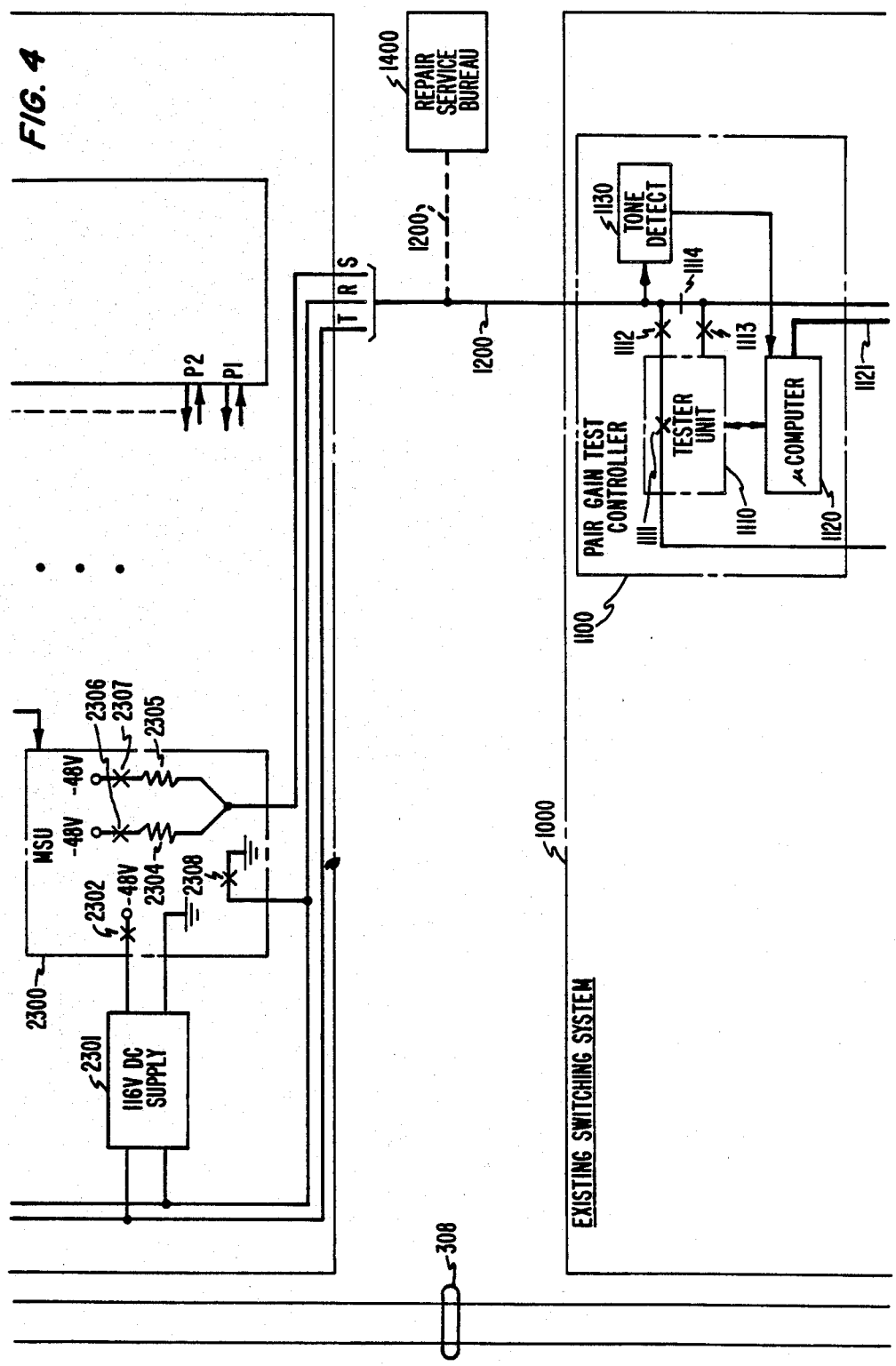

Although only one test trunk 1200 is shown in FIG. 4, test controller 1100 provides test access from repair service bureau 1400 via a plurality of test trunks. The receipt of the test tone on one of the test trunks defines which one of the trunks is requesting a connection. The test tone transmitted by channel unit CU1' is received on trunk 1200 by a tone detector 1130, which then informs microcomputer 1120 of the detected tone on trunk 1200. In response to the receipt of the SEIZE signal from channel test unit 190 and the detection of the test tone from channel CU1', microcomputer 1120 transmits a PROCEED signal via bus 1121 to channel test unit 190. Channel test unit 190 responds to the PROCEED signal by effecting the transmission of a PROCEED signal via the digital facility 108 derived data link to channel test unit 192 in remote terminal 102.

The receipt of the PROCEED signal by channel test unit 192 enables the closing of relay contacts 194 in channel test unit 192, and the closing of relay contacts 195 and 197 and the opening of relay contacts 196 in channel unit CU1. Subscriber line 1 is thereby connected to DC bypass path 1300 and the master TRU 154 is connected to a termination circuit 193 which initially presents an off-hook, absorptive termination. Channel test unit 192 then returns a PROCEED signal via the digital facility 108 derived data link to channel test unit 190, which responds by closing relay contacts 191 to further extend the metallic connection of subscriber line 1 to test controller 1100, and by transmitting a SLEEVE signal via bus 1121 to microcomputer 1120. In response to the SLEEVE signal, microcomputer 1120 effects the opening of relay contacts 1114 and the closing of relay contacts 1112 and 1113. As a result of the opening of relay contacts 1114, the DC voltage is removed from line 1' and, in response to the detection of such removal by test detector 189, the transmission of the test code to remote terminal 102 and the transmission of the 333-Hz test tone to test controller 1100 are discontinued. Microcomputer 1120 then transmits a LOCK signal via bus 1121 to channel test unit 190 to hold up the connection until testing is complete, at which time, removal of the LOCK signal will drop the entire connection.

The final cut-through of the test trunk 1200 to the metallic DC bypass path 1300 occurs when repair service bureau 1400 removes the DC voltage. Such removal is detected by tester unit 1110 via contacts 1112 and results in the closure of relay contacts 1111 within tester unit 1110. Execution of the above-described test set-up sequence requires approximately one second, and tester unit 1110 informs repair service bureau 1400 of the completion of the sequence by placing a 1000 ohm leakage resistance (not shown) from the tip conductor of trunk 1200 to ground. This resistance is subsequently removed when repair service bureau 1400 removes the DC voltage. The testing of subscriber line 1 by repair service bureau 1400 via DC bypass path 1300 can now begin. At the same time that subscriber line 1 is being tested, the assigned channel 13 of digital facility 108 and the associated channel units CU1' and CU1 are tested by tester unit 1110 via relay contacts 1113 and the metallic path through analog switch 1010. The testing of lines served via digital carrier facilities from a repair service bureau is described in the *Bell System Technical Journal*, part 2, of December 1984.

Replacement Digital Switching System 2000

Figure 5:
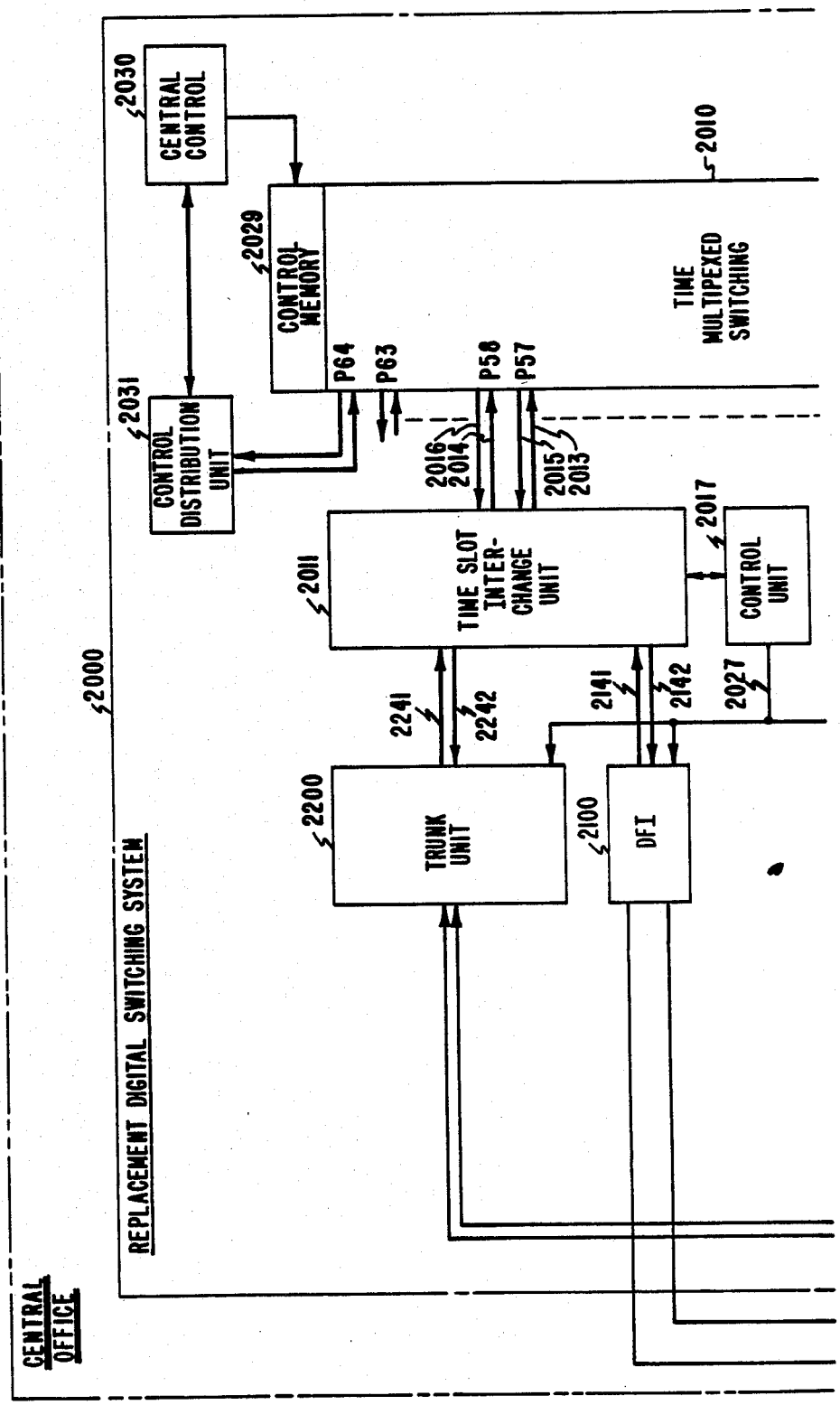

Replacement digital switching system 2000 comprises a time-space-time switching network controlled by a central control 2030 and a plurality of distributed control units of which only control unit 2017 is explicitly shown in FIG. 5. Time-multiplexed switch 2010 represents the central space stage of the switching network and includes a time-shared space division switch which operates in frames of 256 time slots of approximately 488 nanoseconds each to complete paths among its input and output ports P1 through P64. Control information defining the switching path between the input and output ports to be connected during each time slot is stored in a control memory 2029 which is read each time slot to establish those connections. Time-slot interchange unit 2011 is representative of a plurality of such units and comprises the time stages of the switching network. Time-slot interchange unit 2011 receives information from peripheral units on 32-channel time-multiplexed data buses, e.g., 2141 and 2241, and switches such received information to the two 256-channel time-multiplexed lines 2013 and 2014 under the control of instructions from control unit 2017. Time-slot interchange unit 2011 also receives information from time-multiplexed switch 2010 on the two 256-channel time-multiplexed lines 2015 and 2016, and then transmits the information to peripheral units on 32-channel time-multiplexed data buses such as buses 2142 and 2242. Control unit 2017 communicates with central control 2030 and with the other distributed control units (not shown) via predetermined channels of time-multiplexed switch 2010 and control distribution unit 2031.

Trunk unit 2200, digital facility interface 2100, and metallic services unit 2300 are representative of the peripheral units of system 2000. Trunk unit 2200 is used to terminate analog trunks such as trunk 1200. Digital facility interface 2100 is used to terminate digital carrier facilities such as digital facility 308 which will be used to interface the digital facility 108 serving subscriber lines 1 through 48 via remote terminal 102. Metallic services unit 2300 is used to provide required metallic connections to the lines and trunks of system 2000. Trunk unit 2200, digital facility interface 2100, and metallic services unit 2300 are all operated under the control of control unit 2017 via a control bus 2027.

Digital Facility Interface 2100

Figure 10:
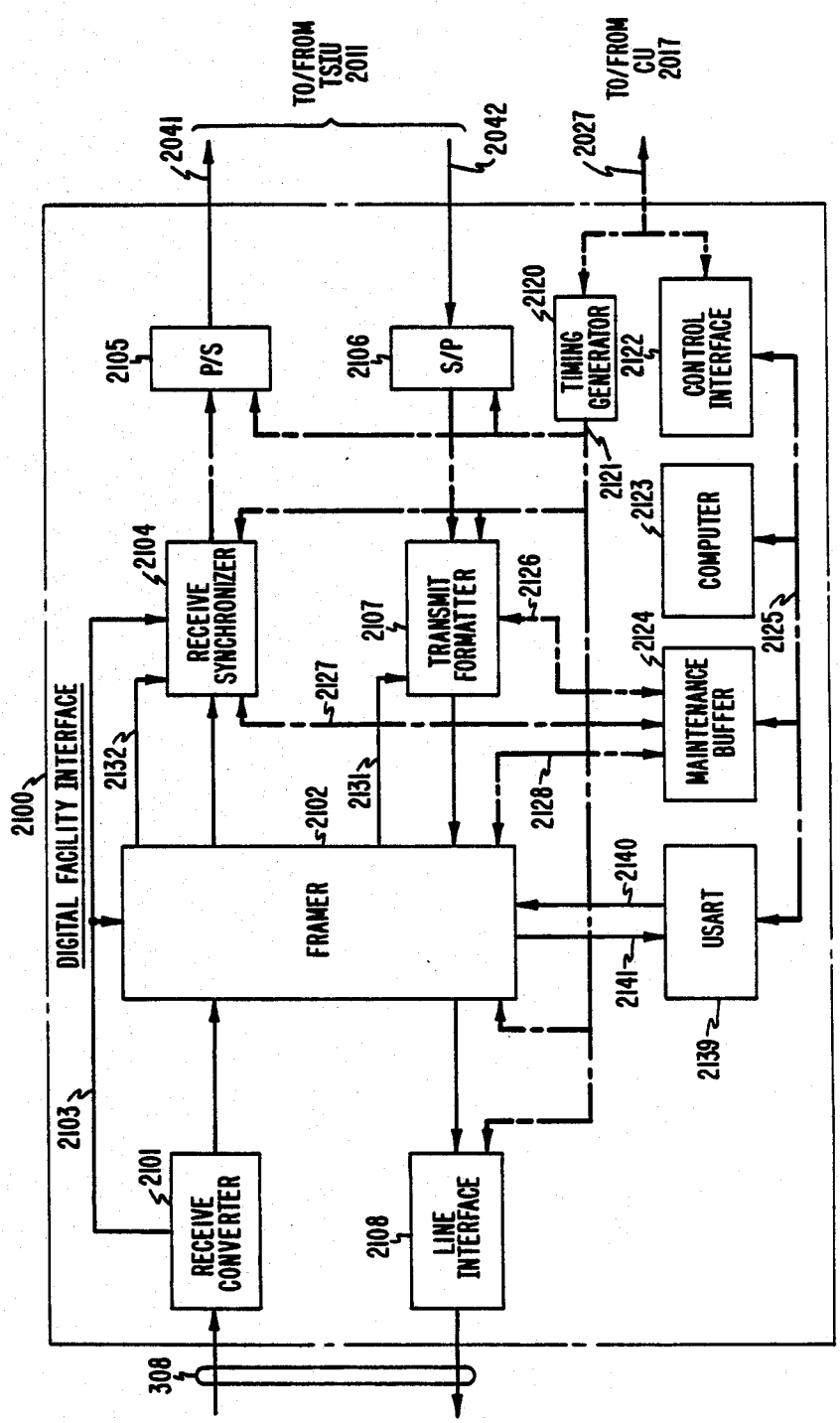
FIG. 10 is a detailed diagram of a digital facility interface in the replacement switching system of the test configuration of FIGS. 2 through 5.

FIG. 10 is a more detailed diagram of digital facility interface 2100. Control unit 2017, transmits timing signals via control bus 2027 to a timing generator 2120 included in digital facility interface 2100. These timing signals comprise a 4.096-megahertz clock signal and an 8-kilohertz frame sync pulse derived from the data stream transmitted by time-multiplexed switch 2010 output port P57. In response, timing generator 2120 generates and transmits various timing signals, referred to herein as system timing signals, via a path 2121 to a serial-parallel register 2106, a transmit formatter 2107, a framer 2102, a line interface 2108, a receive synchronizer 2104 and a parallel-serial register 2105 within digital facility interface 2100. Data words are received serially by serial-parallel register 2106 from time-slot interchange unit 2011 on 32-channel time-multiplexed line 2042 at a bit rate of 4.096-megahertz and are transmitted in 16-bit parallel format to transmit formatter 2107. Transmit formatter 2107 extracts the information in 24 of the 32 channels from line 2042 and serially transmits that information in the format of FIG. 8 to framer 2102. Framer 2102 receives system timing signals from timing generator 2120 and derives therefrom a superframe sync pulse defining a superframe of 24 frames, the superframe having a duration of 3 milliseconds. Framer 2102 transmits this superframe sync pulse to transmit formatter 2107 on a conductor 2131. The selection of the 24 channels to be extracted is predetermined at system initialization by control unit 2017, which transmits channel-defining signals via control bus 2027 and a control interface 2122 to a computer 2123. A bus 2125 interconnects control interface 2122, computer 2123 and a maintenance buffer 2124. Computer 2123 informs transmit formatter 2107 of the 24 selected channels via maintenance buffer 2124 and a path 2126. Further, control unit 2017 can subsequently change the selected line 2042 channels. Transmit formatter 2107 receives a 1.544-megahertz system timing signal from timing generator 2120 and uses that timing signal to transmit data in the FIG. 8 format to framer 2102 at a bit rate of 1.544 megahertz. Framer 2102 inserts the appropriate framing bits in the 193rd or last bit position of the FIG. 8 frame and transmits the resulting frames via an electrical signal-conditioning line interface 2108 to digital facility 308 at the 1.544-megahertz bit rate. Computer 2123, in response to instructions from control unit 2017, can effect the transmission of messages on the derived data link of digital facility 308. Computer 2123 transmits a given message via bus 2125 to a universal synchronous asynchronous receiver transmitter (USART) 2139, which serially transmits the bits of the message on a conductor 2140 to framer 2102. Framer 2102 then inserts those message bits in the last bit position of predetermined frames on digital facility 308 which do not include framing bits.

Data words are received from digital facility 308 at a 1.544-megahertz bit rate in the FIG. 8 format by a receive converter 2101 which transmits the received data words to framer 2102. Receive converter 2101 also includes a clock recovery circuit (not shown) which derives a 1.544-megahertz clock signal, referred to herein as a line timing signal, and transmits that signal via a conductor 2103 to framer 2102 and receive synchronizer 2104. Framer 2102 searches the incoming data stream framing bits from receive converter 2101 to determine correct frame alignment and reports any errors to computer 2123 via a path 2128, maintenance buffer 2124 and bus 2125. To receive derived data link messages, framer 2102 also extracts bits from predetermined frames from digital facility 308 which do not include framing bits and serially transmits the extracted bits to USART 2139 on a conductor 2141. Completed messages are then conveyed from USART 2139 to computer 2123 via bus 2125 and subsequently to control unit 2017 via control interface 2122 and control bus 2027. Framer 2102 transmits the data words received from receive converter 2101 to receive synchronizer 2104 at a bit rate of 1.544 megahertz using the line timing signal derived by receive converter 2101. Framer 2102 also uses that line timing signal to derive a superframe sync pulse defining a superframe of 24 frames from digital facility 308. Framer 2102 transmits that superframe sync pulse to receive synchronizer 2104 on conductor 2132. Receive synchronizer 2104 includes a two-frame, elastic-store buffer (not shown). Data words from framer 2102 are shifted into this buffer at a rate determined by the line timing signal from receive converter 2101. Data words are shifted out of the buffer at a rate determined by a system timing signal from timing generator 2120. Accordingly, the data flow is converted from digital facility 308 timing to switching system 2000 timing. Receive synchronizer 2104 uses the superframe sync pulse from framer 2102 to determine frame position within each frame, and inserts the bits of the 24 channels of each frame in the PCM bit positions of 24 of 32 channels transmitted via parallel-serial register 2105 on time-multiplexed line 2041. Receive synchronizer 2104 also inserts an idle code in the eight unused line 2041 channels. In a manner similar to that for transmit formatter 2107 and line 2042, the selection of the line 2041 channels to be used is predetermined at system initialization by the control unit 2017 and receive synchronizer 2104 is informed of such initialization, and any subsequent changes, via maintenance buffer 2124 and a path 2127.

Pre-cutover Test Method and Apparatus

Figure 11:
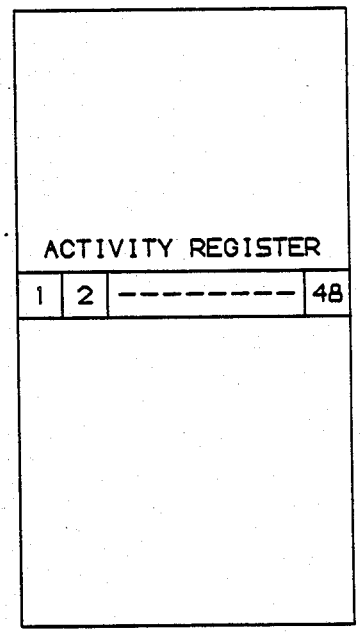
FIG. 11 is a memory map for a computer included in the digital facility interface of FIG. 10.

To conduct a pre-cutover test in accordance with the present invention, the incoming path of the digital facility 308 is bridged onto digital facility 108 such that digital facility interface 2100 can monitor the transmissions from remote terminal 102 to central office terminal 100 during the continued operation of switching system 1000. A repeater 303 is included to boost the signal strength sufficiently from digital facility 108 to assure reliable reception by digital facility interface 2100. As has been discussed, whenever one of the subscriber lines such as line 1 goes off-hook, the associated channel unit detects the state transition and an activity message (FIG. 7) is transmitted from remote terminal 102 via the digital facility 108 derived data link to central office terminal 100. During the pre-cutover test, digital facility interface 2100 monitors such activity messages and maintains an activity register in microcomputer 2123 (FIG. 11) reflecting the status of each of the subscriber lines 1 through 48.

Trunk 1200, which in the previous description was connected to repair service bureau 1400, is now connected to trunk unit 2200 of system 2000. A 116-volt DC supply 2301 included in system 2000 is connected between the tip and ring conductors of trunk 1200. DC supply 2301 is powered from a −48-volt DC office supply via contacts 2302 of metallic services unit 2300. The sleeve conductor of trunk 1200 is biased in a negative, high-current condition via a 1100-ohm resistor 2304 when contacts 2306 are closed to the −48-volt DC office supply. The sleeve conductor of trunk 1200 is biased in a negative, low-current condition via a 6500-ohm resistor 2305 when contacts 2307 are closed to the −48-volt DC office supply. Such biasing is necessary to properly interface with test controller 1100 and analog switch 1010 during testing. Contacts 2308 of metallic services unit 2300 are used to ground the ring conductor of trunk 1200 for testing coin lines.

Figure 12:
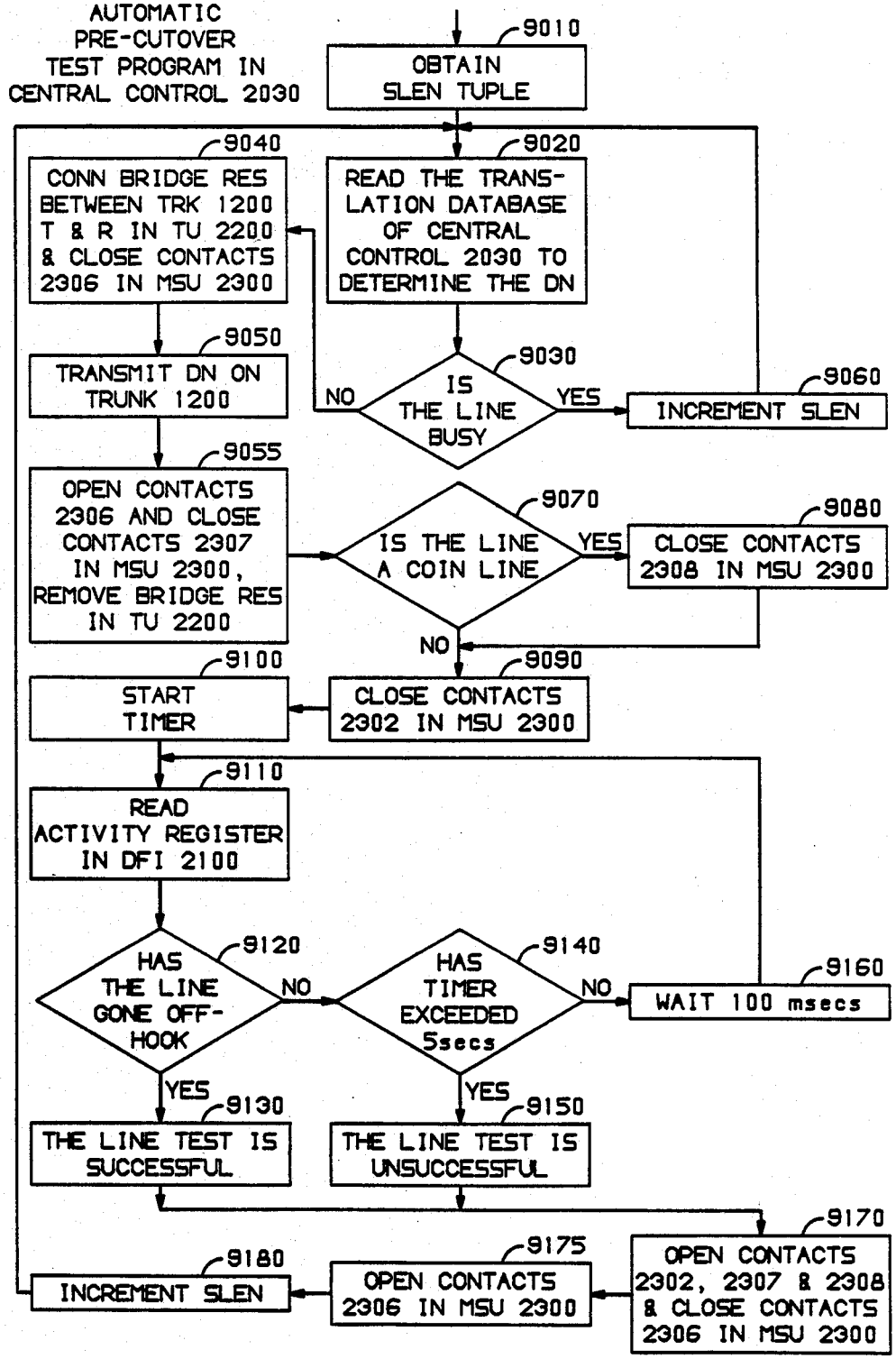
FIG. 12 is a flow chart of an automatic pre-cutover test program performed by the replacement switching system in the test configuration of FIGS. 2 through 5.

A flow chart of the automatic pre-cutover test program executed by central control 2030 is shown in FIG. 12. Execution begins with block 9010 during which a subscriber line equipment number (SLEN) tuple is obtained from the memory of central control 2030 either automatically at the beginning of the test program or in response to an input from a craftsperson. The SLEN tuple for subscriber line 1 defines for example that line 1 is associated with digital facility interface 2100 and time-slot interchange unit 2011. Execution proceeds to block 9020 and the translation database stored in the memory of central control 2030 is read to determine the directory number (DN) associated with subscriber line 1. Execution proceeds to decision block 9030 during which a determination is made of whether or not subscriber line 1 is presently busy. Control unit 2017 and central 2030 are periodically updated with the status of the subscriber lines 1 through 48 as maintained in the activity register in digital facility interface 2100. If it is determined that subscriber line 1 is presently busy, no test is conducted, the SLEN is incremented in block 9060, and execution returns to block 9020. If subscriber line 1 is idle, execution instead proceeds to block 9040 and a bridge resistor is connected by trunk unit 2200 across the tip and ring conductors of trunk 1200 and contacts 2306 of metallic services unit 2300 are closed to bias the sleeve conductor of trunk 1200 in the negative high-current condition to seize trunk 1200. Then during block 9050 the DN is transmitted from trunk unit 2200 via trunk 1200 to analog switch 1010. Either dial pulse or dual tone multifrequency signaling may be used to transmit the DN depending on the signaling expected by system 1000. Central control 1020 responds by reading its translation database to determine the subscriber line defined therein as being associated with the received DN. If the translation databases of both systems 1000 and 2000 are consistent, the received DN is found to be associated with subscriber line 1. Central control 1020 therefore effects the completion of a metallic path from trunk 1200 to the analog line 1' corresponding to subscriber line 1. Following the transmission of the DN in block 9050, execution proceeds to block 9055 wherein contacts 2306 are opened and contacts 2307 are closed to apply a negative, low-current condition to the sleeve conductor of trunk 1200, and the bridge resistor previously connected between the tip and ring conductors of trunk 1200 is removed. Execution proceeds to decision block 9070 and a determination is made based on the data stored by central control 2030 of whether subscriber line 1 is a coin line. If it is a coin line, contacts 2308 are closed in metallic services unit 2300 during block 9080 to ground the ring conductor of trunk 1200 as is required to test coin lines. Execution proceeds to block 9090 from either blocks 9070 or 9080 and contacts 2302 are closed in metallic services unit 2300 to energize DC supply 2301 to apply a 116-volt DC voltage between the tip and ring conductors of trunk 1200 as a control signal. As was true in the above-described channel test controlled from repair service bureau 1400, the 116-volt control signal is detected by test detector 189 of channel unit CU1', one of the digital facility 108 channels, e.g., channel 13, is selected and instructions are written in TSI 120 and TSI 122 to map analog line 1' to the selected channel 13 of digital facility 108. Central office terminal 100 transmits a trunk assignment message (FIG. 6) via the digital facility 108 derived data link to remote terminal 102 and assignment instructions are written in TSI 162 and TSI 164 to map digital facility 108 channel 13 to subscriber line 1. The detection of the 116-volt DC control signal by test detector 189 results in the transmission by channel unit CU1' of the 333-Hz test tone via line 1' and the metallic path of analog switch 1010 to test controller 1100 and the transmission of a test code in channel 13 of digital facility 108 to channel unit CU1 of remote terminal 102. The transmission of the SEIZE and PROCEED signals then follows in the same manner as described above with respect to FIG. 9. The receipt of the PROCEED signal at remote terminal 102 results in the closing of contacts 194 in channel test unit 192, and the closing of contacts 195 and 197 and the opening of contacts 196 in channel unit CU1. Subscriber line 1 is thereby connected to the DC bypass path 1300 and an off-hook, absorptive termination in termination circuit 193 is connected to TRU 154. The off-hook termination is detected in channel unit CU1 and an off-hook signal is transmitted over bus 155 to transmit TSI 164 and subsequently a new activity word defining the change in status of subscriber line 1 is stored in microcomputer 160. An activity message (FIG. 7) is subsequently transmitted from microcomputer 160 of remote terminal 102 via the digital facility 108 derived data link to microcomputer 124 of central office terminal 100. However, since digital facility interface 2100 is monitoring, via facility 308, the transmissions from remote terminal 102 to central office terminal 100, digital facility interface 2100 also receives the activity message and updates the activity register stored in microcomputer 2123 (FIG. 11) to reflect the off-hook status of line 1.

Returning to the program execution of central control 2030, after the 116-volt DC control signal is applied by closing contacts 2302 of metallic services unit 2300 during block 9090, execution proceeds to block 9100 and a 5-second timer is started. In block 9110, the activity register in digital facility interface 2100 is read. During decision block 9120, a determination is made, based on the read activity register, of whether subscriber line 1 has gone off-hook. If not, execution proceeds to decision block 9140 and a check is made to determine whether the 5-second timer has expired. If it has not, execution proceeds to block 9160 and, after a 100-millisecond delay, returns to block 9110 and the activity register in digital facility interface 2100 is again read. Blocks 9110, 9120, 9140 and 9160 are repetitively executed until either the read activity register indicates that subscriber line 1 has gone off-hook or the 5-second timer expires. If the 5-second timer expires, execution proceeds from decision block 9140 to block 9150 and the unsuccessful test of subscriber line 1 is appropriately recorded. If the activity register reflects the off-hook status of subscriber line 1 before the 5-second timer expires, execution proceeds from decision block 9120 to block 9130 and the successful test of subscriber line 1 is recorded. Execution proceeds from either block 9130 or block 9150 to block 9170 and contacts 2302, 2307 and 2308 are opened and contacts 2306 are closed in metallic services unit 2300 to remove the 116-volt DC control signal, to again apply the negative, high-current condition to the sleeve conductor of trunk 1200 and to remove the ground connection from coin lines. Contacts 2306 are subsequently opened in block 9175 to effect the opening of the sleeve conductor of trunk 1200. Such opening interrupts the test sequence being performed by test controller 1100 and the various test connections that had been completed are dropped. Execution proceeds to block 9180 and the SLEN is incremented and execution returns to block 9020 for the testing of subscriber line 2. The program repeats until all such subscriber lines have been tested.

The above-described pre-cutover test advantageously verifies the proper operation of remote terminal 102, digital facilities 108 and 308 and digital facility interface 2100 in addition to verifying the consistency of the translation databases stored in central control 2030 and central control 1020.

Once the pre-cutover test is completed, cutover is effected by bridging the outgoing path of digital facility 308 including a repeater 304 onto digital facility 108 and disconnecting central office terminal 100.

It is to be understood that the above-described test arrangement and method are merely illustrative of the principles of the present invention and that many variations may be devised by those skilled in the art without departing from the spirit and scope of the invention. For example, although the digital facility 108 in the described embodiment is used in a concentrated mode of operation where 48 subscriber lines are served via the 24 facility 108 channels, digital facility 108 can also be used in a non-concentrated mode to serve 24 subscriber lines, in which case the trunk assignments messages described above are not required. Although the existing switching system 1000 of the described embodiment includes a central office terminal 100, the invention is equally applicable when the switching system being replaced is directly interfaced to digital facility 108 without a central office terminal. The line-identifying digital signatures in the described embodiment are activity messages comprising a plurality of bits used to define the on-hook/off-hook status of lines. Other line-identifying digital signatures including digital signals representing tones or commands in specific line-associated channels are contemplated.

What is claimed is:

1. A test arrangement for use prior to the replacement of a first switching system serving a plurality of subscriber lines via at least one digital carrier facility and via a remote terminal, by a second switching system to be cut over to serve said lines via said facility and said remote terminal, said first and second systems each storing translation data defining the association of directory numbers with said lines, said first system being responsive to received directory numbers for determining ones of said lines defined by said translation data of said first system as being associated with said received directory numbers, and said first system being responsive to control signals for effecting tests of said lines including the generation on an incoming path of said facility from said remote terminal, of digital signatures representing activity at said lines, said test arrangement comprising
    means for determining a directory number defined by said translation data of said second system as being associated with a selected one of said lines,
    means for transmitting said determined directory number to said first system to determine the one of said lines defined by said translation data of said first system as being associated with said determined directory number,
    means for transmitting one of said control signals to said first system to effect a test of said determined line including the generation of a digital signature on said incoming path representing activity at said determined line, and
    means for monitoring said incoming path to detect a digital signature representing activity at said selected line.

2. A test arrangement in accordance with claim 1 wherein said second system includes control means for controlling said second system and wherein said test arrangement is integrated into said second system and is operated under program control by said control means.

3. A test arrangement in accordance with claim 1 further comprising
    means bridged onto said incoming path for receiving digital information and
    repeater means for amplifying digital information received by said receiving means for transmission to said monitoring means.

4. A test arrangement in accordance with claim 3 wherein said monitoring means comprises
    an activity register comprising a plurality of bits each defining the activity status of a corresponding one of said lines,
    means responsive to said digital signature representing activity at said determined line for storing a predetermined logic value in the one of said bits of said activity register corresponding to said determined line and
    means for reading the one of said bits of said activity register corresponding to said selected line to detect a predetermined logic value.

5. A test arrangement in accordance with claim 4 wherein said first system is responsive to other control signals for discontinuing tests of said lines, and wherein said arrangement further comprises means responsive to a detection of said digital signature representing activity at said selected line, for transmitting one of said other control signals to said first system to discontinue said test of said determined line.

6. A test arrangement in accordance with claim 5 further comprising means for transmitting one of said other control signals to said first system to discontinue said test of said determined line when a predetermined time has elapsed after the transmission of said one of said control signals.

7. A test arrangement in accordance with claim 1 wherein said monitoring means comprises an activity register comprising a plurality of bits each defining the activity status of a corresponding one of said lines, means responsive to said digital signature representing activity at said determined line for storing a predetermined logic value in the one of said bits of said activity register corresponding to said determined line and means for reading the one of said bits of said activity register corresponding to said selected line to detect a predetermined logic value.

8. A test arrangement in accordance with claim 1 wherein said first system is responsive to other control signals for discontinuing tests of said lines, and wherein said arrangement further comprises means responsive to a detection of said digital signature representing activity at said selected line, for transmitting one of said other control signals to said first system to discontinue said test of said determined line.

9. A method of testing each of a plurality of subscriber lines prior to the replacement of a first switching system serving said lines via at least one digital carrier facility and via a remote terminal, by a second switching system to be cut over to serve said lines via said facility and said remote terminal, said first and second systems each storing translation data defining the association of directory numbers with said lines, said first system being responsive to received directory numbers for determining ones of said lines defined by said translation data of said first system as being associated with said received directory numbers, and said first system being responsive to control signals for effecting tests of said lines including the generation on an incoming path of said facility from said remote terminal, of digital signatures representing activity at said lines, said method comprising the following steps:

determining a directory number defined by said translation data of said second system as being associated with a selected one of said lines, transmitting said determined directory number to said first system to determine the one of said lines defined by said translation data of said first system as being associated with said determined directory number, transmitting one of said control signals to said first system to effect a test of said determined line including the generation of a digital signature on said incoming path representing activity at said determined line, and monitoring said incoming path to detect a digital signature representing activity at said selected line.

10. A test method in accordance with claim 9 wherein said second system includes an activity register comprising a plurality of bits each defining the activity status of a corresponding one of said lines, and wherein said monitoring step further comprises responding to said digital signature representing activity at said determined line by storing a predetermined logic value in the one of said bits of said activity register corresponding to said determined line and reading the one of said bits of said activity register corresponding to said selected line to detect a predetermined logic value.

11. A test method in accordance with claim 9 wherein said first system is responsive to other control signals for discontinuing tests of said lines, said test method further comprising the following step:

responding to a detection of said digital signature representing activity at said selected line by transmitting one of said other control signals to said first system to discontinue said test of said determined line.

12. In a pre-cutover test arrangement comprising a first switching system serving a plurality of subscriber lines via at least one digital carrier facility and via a remote terminal interfacing said lines to said facility, said first system storing translation data defining the association of directory numbers with said lines, and a second switching system to be cut over to serve said lines via said facility and said remote terminal, said second system also storing translation data defining the association of directory numbers with said lines, a test method comprising the following steps:

(A) said second system determining a directory number defined by said translation data of said second system as being associated with a selected one of said lines, (B) said second system transmitting said directory number determined in said step (A) to said first system, (C) said first system determining the one of said lines defined by said translation data of said first system as being associated with said directory number transmitted in said step (B), (D) said first system transmitting digital information to said remote terminal defining said line determined in said step (C), (E) said remote terminal transmitting on said facility a digital signature representing activity at said line determined in said step (C), and (F) said second system monitoring said facility to detect a digital signature representing activity at said selected line.

13. In a pre-cutover test arrangement for verifying a plurality of subscriber lines served via at least one digital carrier facility and via a remote terminal interfacing said subscriber lines to said facility, said test arrangement comprising an office-to-office trunk;

a first switching system including an analog switch connected to said trunk and to a plurality of analog lines each corresponding to one of said subscriber lines, said first system also comprising means for storing translation data defining the association of directory numbers with said subscriber lines, a central office terminal interfacing said analog lines with said facility, and a test controller coupled to said trunk and to said central office terminal; and a second switching system comprising means for storing translation data defining the association of directory numbers with said subscriber lines, a trunk unit connected to said trunk, a digital facility interface bridged onto said facility, said digital facility interface including an activity register comprising a plurality of bits each defining the off-hook/on-hook status of a corresponding one of said subscriber lines, and a source of a predetermined DC control voltage;

a method of verifying a selected one of said subscriber lines comprising the following steps:

(A) said second system determining a directory number defined by said translation data of said second system as being associated with said selected subscriber line, (B) said trunk unit transmitting said determined directory number on said trunk to said first system, (C) said first system determining the one of said subscriber lines defined by said translation data of said first system as being associated with said directory number transmitted in said step (B), (D) said analog switch establishing a metallic path from said trunk to the one of said analog lines corresponding to said subscriber line determined in said step (C), (E) said second system connecting said source to said trunk to apply said predetermined DC control voltage via said metallic path and said one of said analog lines to said central office terminal, (F) said central office terminal responding to said predetermined DC control voltage on said one of said analog lines by initiating a handshaking procedure among said central office terminal, said remote terminal and said test controller including the transmission of digital information on said facility to said remote terminal defining a test of said subscriber line determined in said step (C), (G) said remote terminal responding to said digital information transmitted in said step (F) by generating an off-hook condition of said subscriber line determined in said step (C), (H) said remote terminal transmitting an activity message on said facility defining said off-hook condition of said subscriber line determined in said step (C), (I) said digital facility interface monitoring activity messages on said facility and updating said activity register to reflect off-hook conditions indicated by said monitored activity messages, and (J) said second system reading the one of said bits of said activity register corresponding to said selected subscriber line to detect an off-hook condition.

14. A method in accordance with claim 13 wherein said facility comprises a plurality of digital channels and wherein said digital information transmitted in said step (F) includes a definition of a selected one of said channels, and also includes a test signal transmitted in said selected channel.

* * * * *